March 24, 1970 P. J. GEERLINGS 3,502,053
APPARATUS FOR MIXING, DISTRIBUTING AND DISPENSING
FEED FOR ANIMALS
Filed June 10, 1968 2 Sheets-Sheet 1

INVENTOR.
Petrus J. Geerlings
BY
ATTORNEYS

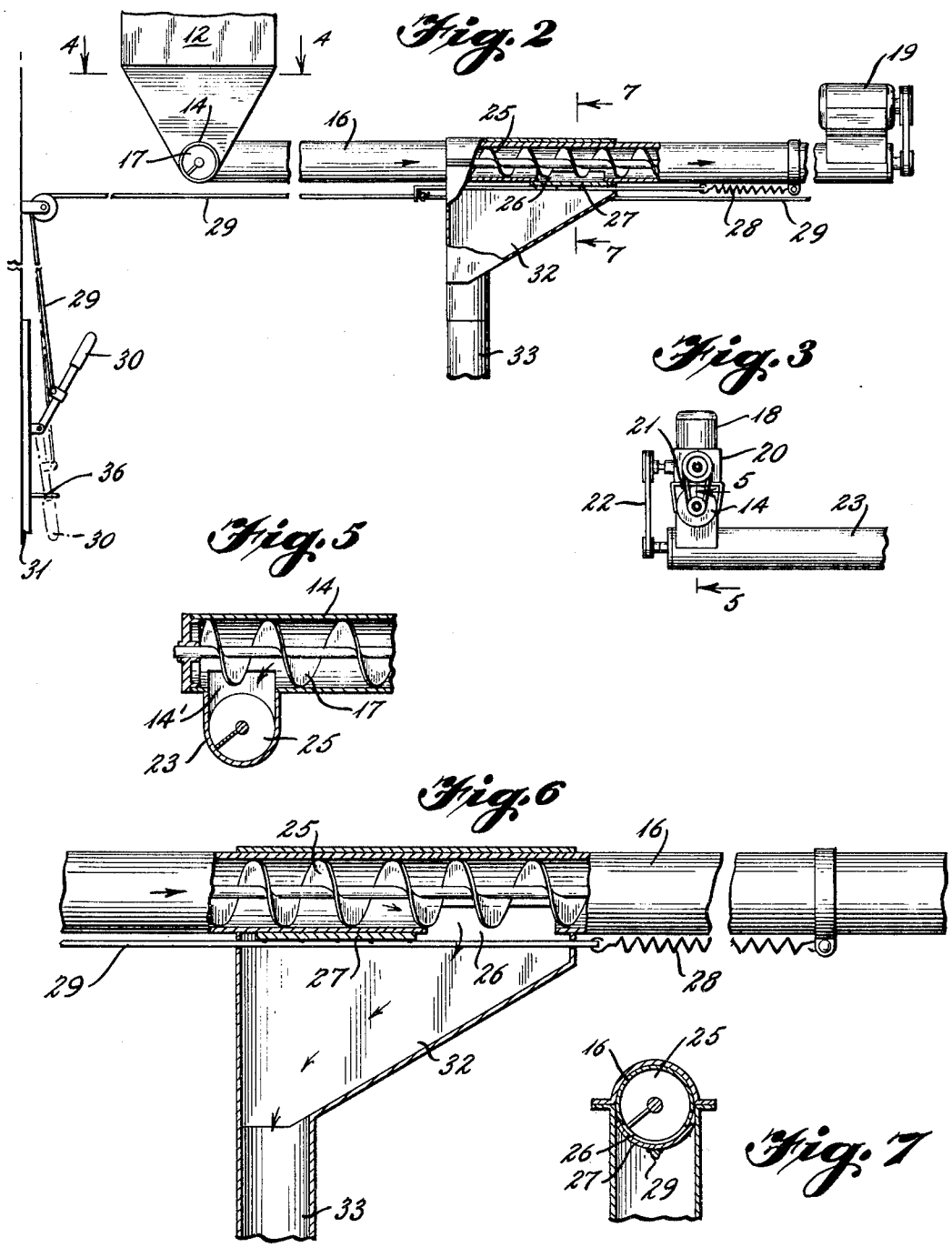

3,502,053
Patented Mar. 24, 1970

3,502,053
APPARATUS FOR MIXING, DISTRIBUTING AND
DISPENSING FEED FOR ANIMALS
Petrus J. Geerlings, P.O. Box 179,
Waterloo, Iowa 50704
Filed June 10, 1968, Ser. No. 735,912
Int. Cl. A01k 31/14
U.S. Cl. 119—56                    4 Claims

ABSTRACT OF THE DISCLOSURE

Apparatus for blending or mixing, distributing, and dispensing in individual feeding areas feed for animals subject to individual control from a central panel and including conveyors which extend to individual bins or feeding areas enabling the dispensing of a particular type of mix in certain areas and another type of mix in other areas.

BACKGROUND OF THE INVENTION

Field of the invention

The invention is directed to the supplying of feed of different characteristics to animals in different areas having different feed requirements and relates particularly to the blending and supplying of feed selectively to certain areas and blending and supplying other feed to other areas through substantially the same distribution system.

Description of the prior art

Various types of devices have been produced for combining ingredients to supply feeds having contents of a particular nutrient value to stock or animals of various kinds. However, these prior art units have supplied a single mixture to all of the areas within that distribution system without the advantage of selectivity and control from a central location.

SUMMARY OF THE INVENTION

The present invention is an apparatus for mixing, distributing and dispensing feed for stock animals and includes a blender which comminutes various feed materials and mixes the same in desired proportions, after which the blended feed is discharged into a hopper to which a plurality of conveyors are connected. If desired certain of the conveyors may discharge feed into additional conveyors so that the feed is distributed over a wide area. Below the conveyors is located a plurality of compartments or stalls for animals and within each stall is a feeder connected to one of the conveyors. A valve mechanism is disposed intermediate the conveyor and the feeder, and such valve mechanism is connected to control means located in a remote position so that certain feeders will be supplied with feed when a first blend is distributed through the conveyor system and certain other feeders will be supplied with feed when another blend is distributed through the same conveyor system. Also the amount of feed discharged into each feeder can be controlled from the remote position.

It is an object of the invention to provide a practical reliable apparatus for preparing and distributing feed selectively in several locations with delivery control from a central station.

Another object of the invention is to provide a feed system for animals including multiple conveyors with a plurality of feeders connected thereto and means for controlling the amount of material supplied to each feeder from a remote position.

BRIEF DESCRIPTION OF THE DRAWINGS

FIG. 2, a fragmentary view of the central conveyor along line 2—2 of FIG. 1;

FIG. 3, a side elevation of the outside conveyor at the upper left corner of FIG. 1;

FIG. 5, an enlarged fragmentary detailed section on the line 5—5 of FIG. 3;

FIG. 6, an enlarged fragmentary view of the valve distribution mechanism illustrating the center of FIG. 2; and FIG. 7, a vertical section therethrough on the line 7—7 of FIG. 2.

DESCRIPTION OF THE PREFERRED EMBODIMENT

Figure 1:
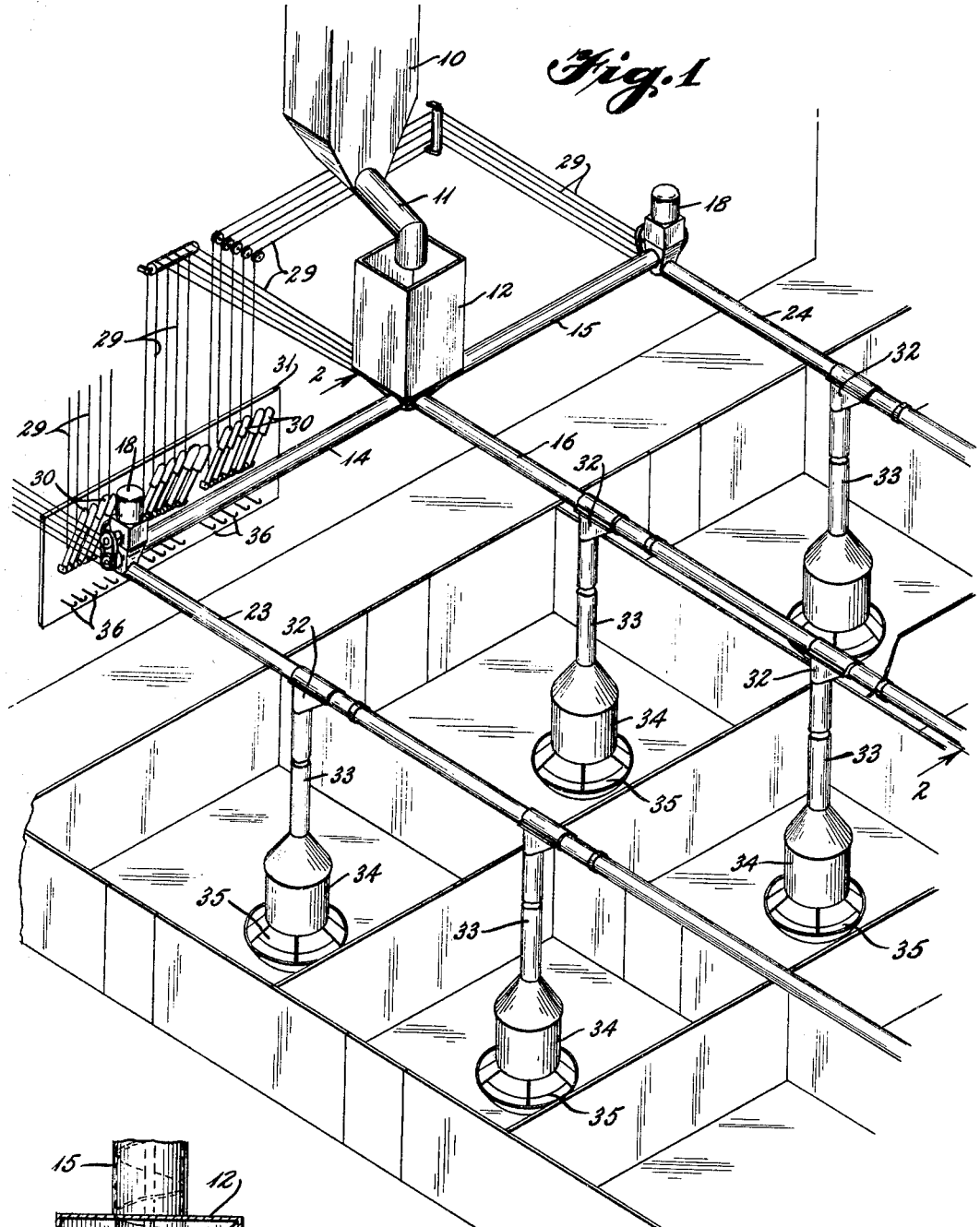
FIG. 1 is a fragmentary perspective of the general layout of the invention.

With continued reference to the drawings, a feed mixer or blender 10 such as that disclosed in Patent No. 3,182,-968, is adapted to supply feed through a pipe 11 to a distribution hopper 12. The distribution hopper 12 has walls 13 which converge into a pair of lateral or transverse conveyors 14 and 15 and a longitudinal conveyor 16, each of the conveyors 14 and 15 having internal augers or screws 17 and 17′ by means of which the feed is carried along the respective conveyors.

The augers or screws of conveyors 14 and 15 are driven from their outer or remote ends by motors 18 and the auger or screw of conveyor 16 is driven by a motor 19 from its outer or remote end (FIG. 2). The drive of the conveyors 14 and 15 is produced through gear boxes 20 and pulley and V-belt transmissions 21. From the gear boxes 20 also are driven pulley and V-belt transmissions 22 and augers or screws of additional conveyors 23 and 24. The augers or screws of the conveyors 14 and 15 have flights which carry the feed in opposite directions to the conveyors 16, 23 and 24 and the conveyors 16, 23 and 24 contain augers or screws 25.

The conveyors 16, 23 and 24 are provided with suitably located discharge openings 26 with valves or closures 27 normally urged toward closed position by means of springs 28. These closures 27 are adapted to be opened by means of cables 29 connected to operating levers 30 on a control panel 31 at a convenient location or central station remote from the several openings. When the closures 27 are operated to allow feed to drop, the feed is received in a tapered receiving member 32 from which the grain can drop by gravity through a downspout 33 to a feeder 34 and into a trough 35. The feeders 34 are located in the several feed areas and are adapted to be supplied with feed by operating the levers 30 on the control panel 31 to supply feed to the several feeders as is desired or required. When the levers 30 are moved downwardly to open the closures 27, such levers may be held in the down position in any desired manner as by hooks 36.

As illustrated in FIG. 5 the conveyor 14 has an opening 14′ at its lower portion which communicates with the conveyor 23 and with the auger or screw 25 therein. In a like manner the conveyor 15 has a connection with the conveyor 24.

Figure 4:
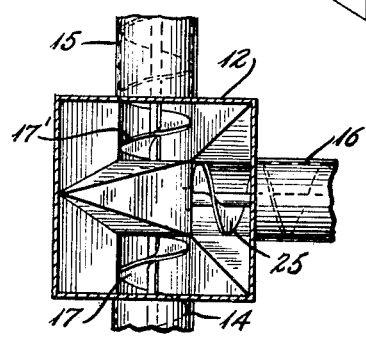
FIG. 4, a horizontal section on the line 4—4 of FIG 2.

In the operation of the apparatus, feed is mixed or blended in the mixer or blender 10 and this feed is supplied through the pipe 11 to the distribution hopper 12. Feed is distributed from the hopper 12 to the several areas through the several conveyors. As illustrated in FIG. 4 feed in the distribution hopper 12 will enter the conveyors 14, 15 and 16 which conveyors include the augers or screws 17, 17′ and 25, such screws being driven by the motors 18 and 19. Feed passing through the conveyor 16 will be supplied to the intermediate feeders 34 while feed supplied through the conveyors 14 and 15 will be transferred to and carried by the conveyors 23 and 24 to supply the outside feeders and by the operation of the respective levers 30 the control of the supply to the respective feeders is accomplished.

What is claimed is:

1. The combination of blending means for combining ingredients to obtain a stock feed of a desired character, conveyor means extending from said blending means to multiple distribution locations for the transfer of feed therethrough, stock feeders in each of said multiple distribution locations, connections between said stock feeders and said conveyor means through which feed can be carried to said feeders, said conveyor means having openings for the discharge of feed into said connections, a slidable valve operatively associated with each of said openings, a control panel located in a remote position, a plurality of lever means pivotally mounted on said control panel, cable means connecting said lever means to said slidable valves, and resilient means urging said valves toward closed position, whereby selected valves are opened for selected periods of time when a predetermined blend of ingredients is distributed by said conveyor means.

2. A stock feeding system comprising the combination of blending means for combining ingredients to obtain a stock feed of a desired character, conveyor means for receiving feed from said blending means and distributing said feed to multiple locations, a stock feeder in each of said multiple locations, a connection between each feeder and said conveyor means, valve means in each connection, a control panel located in a remote position from said multiple locations, and individual operating means connecting each of said valve means to said control panel, whereby each of said valve means is selectively operable for a predetermined stock feed.

3. The structure of claim 2 including resilient means for urging said valve means toward closed position.

4. The structure of claim 2 in which operating means includes cable means connected to lever means on said control panel.

References Cited

UNITED STATES PATENTS

| | | | |
|---|---|---|---|
| 3,144,173 | 8/1964 | France et al. | 222—76 |
| 3,171,385 | 2/1965 | Decker et al. | 119—56 X |
| 3,199,731 | 8/1965 | Brauer et al. | 119—56 X |
| 3,330,255 | 7/1967 | Scott et al. | 119—56 X |

ALDRICH F. MEDBERY, Primary Examiner

U.S. Cl. X.R.

119—51; 222—412